United States Patent [19]

Suzuki et al.

[11] Patent Number: 5,395,870
[45] Date of Patent: Mar. 7, 1995

[54] VINYL RESIN COMPOSITION

[75] Inventors: Yoshio Suzuki, Fuji; Masashi Sakamoto, Yokohama, both of Japan

[73] Assignee: Asahi Kasei Kogyo Kabushiki Kaisha, Osaka, Japan

[21] Appl. No.: 140,979

[22] Filed: Oct. 25, 1993

Related U.S. Application Data

[63] Continuation of Ser. No. 555,492, Aug. 15, 1990, abandoned.

[30] Foreign Application Priority Data

| Mar. 29, 1989 | [JP] | Japan | 1-74898 |
| Jun. 20, 1989 | [JP] | Japan | 1-155747 |
| Jun. 20, 1989 | [JP] | Japan | 1-155748 |
| Jun. 22, 1989 | [JP] | Japan | 1-158199 |
| Jun. 22, 1989 | [JP] | Japan | 1-158200 |
| Dec. 28, 1989 | [JP] | Japan | 63-328892 |

[51] Int. Cl.⁶ .................. C08L 33/00; C08L 25/00; C08L 55/02
[52] U.S. Cl. ............ 524/136; 524/139; 524/140; 524/145; 524/157; 524/158; 524/161; 524/166; 524/236; 524/300; 524/394; 524/400; 524/401; 524/428; 524/429; 524/513; 524/514; 525/66; 525/92; 525/131; 525/167; 525/180
[58] Field of Search .............. 525/66, 92, 131, 167, 525/180, 928; 524/136, 139, 140, 145, 157, 158, 161, 166, 236, 300, 394, 400, 401, 428, 429, 513, 514, 910, 912, 913

[56] References Cited

U.S. PATENT DOCUMENTS 4,639,486 1/1987 Liu ........................ 525/66

FOREIGN PATENT DOCUMENTS

| 0242158 | 10/1987 | European Pat. Off. ........ 525/66 |
| 2620717 | 3/1989 | France . |
| 55/36237 | 3/1980 | Japan . |
| 58-134135 | 8/1983 | Japan . |
| 59/193959 | 11/1984 | Japan . |
| 60/23435 | 2/1985 | Japan . |
| 60-158222 | 8/1985 | Japan . |
| 62-011759 | 1/1987 | Japan ........................ 525/66 |
| 62-116659 | 5/1987 | Japan . |
| 62/119256 | 5/1987 | Japan . |
| 63/63739 | 3/1988 | Japan . |
| 63/95251 | 4/1988 | Japan . |
| 63/97653 | 4/1988 | Japan . |

OTHER PUBLICATIONS

Derwent abstract No. AN 240388 (1985).
Chemical Abstract No. CA 104:130483m (1986).

*Primary Examiner*—Patricia A. Short
*Attorney, Agent, or Firm*—Birch, Stewart, Kolasch & Birch

[57] ABSTRACT

There are disclosed a vinyl resin composition which comprises a resin composition comprising a vinyl polymer, a polyamideimide elastomer obtained by reacting a mixture of caprolactam, an aromatic polycarboxylic acid and a specified polyoxyethylene glycol, with 0–0.5 mole of a diamine, etc., per 1 mole of glycol contained in said mixture, the glycol component being present in a proportion of 85–30% by weight in said elastomer and the relative viscosity of the elastomer being at least 1.5 (at 30° C.), and an electrolyte added as desired, and articles molded from the composition.

17 Claims, No Drawings

VINYL RESIN COMPOSITION

This application is a continuation of application Ser. No. 07/555,492, filed on Aug. 15, 1990, now abandoned.

TECHNICAL FIELD

The present invention relates to resin compositions which contain a vinyl resin such as a styrene resin or an acrylic resin, and a polyamideimide elastomer. In particular, said resin compositions have an excellent permanent antistatic property and those having a styrene resin base can be used as antistatic materials for various parts of electronic devices, household appliances, office automation equipment, etc., including video casettes and video disks. Those having an acrylic resin base also have an excellent permanent antistatic property and good transparency. They are inexpensive, and can be used as antistatic materials for various parts of electronic devices, household appliances, office automation equipment, etc., including, for example, lighting fixtures, instrument nameplates and meter covers.

BACKGROUND ART

Styrene resins are inexpensive and excellent in mechanical properties such as mechanical strength and rigidity and in moldability, and accordingly, they are widely used in a variety of fields. However, styrene resins are likely to cause problems due to the development of electrostatic charge when they are used in parts of electronic or electric equipment such as video casettes, IC cards, copying machines, televisions etc., or to cause a staining problem by sticking of the dust caused by electrostatic charges when used in housings of household appliances, office automation equipment, etc.

On the other hand, acrylic resins are excellent in transparency and rigidity and hence are in wide use as the material of various parts of electronic devices, household appliances, office automation equipment, etc., including, for example, lighting fixtures, instrument nameplates and meter covers.

However, similarly to styrene resins, acrylic resins have a high specific surface resistance and are readily electrified by friction etc., so that they are likely to present a poor appearance due to the sticking of the dust and dirt, or cause problems due to the development of electrostatic charge when they are used in parts of electronic instruments or the like.

Accordingly, there has been a desire for the development of a material based on vinyl resins, such as styrene resin and acrylic resin, which has been imparted good antistatic property, while retaining the excellent characteristic properties which are inherent to these resins.

As to the method for imparting an antistatic property to said vinyl resins, it is well known, for example, to incorporate a surface active agent into the resin or coating the agent on the resin surface. In such methods, however, the antistatic agent present on the surface is likely to be removed by water-washing, rubbing, etc., and to impart a permanent antistatic property to a surface is difficult.

Methods comprising adding a polyamide elastomer to a styrene resin to improve the impact resistance and antistatic property of the styrene resin have been proposed in Japanese Patent Application Kokai Nos. 59-193,959, 60-23,435, 63-95,251 and 63-97,653, etc.

The polyamide elastomers used in the above methods include a polyetheresteramide wherein the hard segment is polyamide, the soft segment is polyether and the two segments are connected by an ester linkage; a polyetheramide wherein said two segments are connected by an amide linkage; and a polyesteramide wherein the soft segment is polyester. However, the compatibility of these polyamide elastomers with styrene resins is poor.

Japanese Patent Application Kokai No. 59-193,959 discloses the use of a vinyl copolymer, obtained by copolymerizing a vinyl monomer containing a carboxyl group, to improve the compatibility thereof with a polyamide elastomer and to improve the impact resistance of the composition formed. However, since 40% by weight or more of a polyamide elastomer is used in this case, the resulting composition has a decreased rigidity.

Japanese Patent Application Kokai No. 60-23,435 discloses a composition comprising 5-80 parts by weight of a polyetheresteramide and 95-20 parts by weight of a vinyl copolymer containing a carboxyl group. Although the composition is improved in compatibility and antistatic property, a large amount of the polyetheresteramide must be added in order to obtain a practically useful antistatic property, which resulted in the flexural modulus being unsatisfactory.

Japanese Patent Application Kokai No. 63-95,251 discloses a composition comprising a polyetheresteramide, a rubber-modified styrene resin and a vinyl copolymer containing a carboxyl group, which gives molded products having good antistatic property and gloss.

Further, Japanese Patent Application Kokai No. 63-97,653 discloses a composition obtained by finely dispersing a polyamide elastomer having a size of 0.01-10 μm into a styrene resin to eliminate laminar peeling and to impart an antistatic property.

Polyamide elastomers hitherto investigated for incorporation into styrene resins are polyetheresteramides, polyetheramides, and polyesteramides. However, polyetheramides are disadvantageous with regard to cost because the process for the production of polyetherdiamines is complicated and expensive when polyetherdiamines are used. Polyesteramides have a low hydrophilicity and exhibit an antistatic effect with difficulty.

Among these, polyetheresteramides are advantageous with regard to cost since they can be obtained from relatively inexpensive polyoxyalkylene glycols, as the raw material. Accordingly, an attempt has been made to use them and to improve also the flexural modulus (Japanese Patent Application Kokai No. 63-95,251). However, polyetheresteramides are not fully satisfactory in thermal resistance and, when blended into styrene resins and exposed to high temperatures for a long period of time in molding operations, etc., the resulting molded products would sometimes undergo deterioration in properties including mechanical properties and antistatic property.

On the hand, with regard to the methods for imparting a permanent antistatic property to acrylic resins, there have been disclosed, for example, (1) a method comprising blending into acrylic resins, a vinyl copolymer having a polyoxyethylene chain and a structure of sulfonic acid salt, carboxylic acid salt or quaternary ammonium salt (Japanese Patent Application Kokai Nos. 55-36,237 and 63-63,739) and (2) a method comprising blending a polyetheresteramide into methyl methacrylate-butadiene-styrene copolymers (i.e., MBS resin) or methyl methacrylate-acrylonitrile-butadiene-styrene copolymers (i.e., MABS resin) (Japanese Patent Application Kokai No. 62-119,256).

In method (1) mentioned above, however, the vinyl copolymer to be blended uses a special vinyl monomer and hence is expensive, so that the production cost of the acrylic resin blended with said copolymer becomes inevitably high. Moreover, in the method described in Japanese Patent Application Kokai No. 55-36,237, the amount of the vinyl copolymer blended is large and the deterioration of thermal resistance, etc., which is inherent in an acrylic resin, cannot be avoided. On the other hand, in method (2) mentioned above, the amorphous polyetheresteramide and the MBS or MABS resins are so selected that the difference in their refractive indices is 0.02 or less to ensure the transparency of the resulting composition. This restricts the degree of freedom of the combination and in the case of polymethyl methacrylate, a typical acrylic resin, the refractive index can be difficultly adapted, resulting in lowered transparency.

A prominent feature of acrylic resins is their excellent transparency. When a polymer is blended into acrylic resin to impart a permanent antistatic property thereto, however, the polymer is frequently poor in compatibility with the acrylic resin, resulting in a product of lowered transparency; or even when a product of good transparency is obtained, the product shows an insufficient antistatic effect or a decreased thermal resistance. Further, when a polymer of a complicated structure is prepared to obtain a satisfactory antistatic effect it leads to a high production cost, and an acrylic resin which is inexpensive and has a good antistatic property cannot be obtained.

DISCLOSURE OF THE INVENTION

The object of the present invention is to provide vinyl resin compositions having a permanent antistatic property overcoming the above-mentioned difficulties. The compositions include a styrene resin composition which has a high rigidity and sufficient thermal resistance and exhibits a practical and useful antistatic property, and an acrylic resin which has an excellent antistatic property, thermal resistance and transparency.

The present inventors have made an extensive study on the blend of vinyl resins with a thermoplastic elastomer comprising polyoxyethylene glycol as the principal soft segment, to attain the above-mentioned object. As a result, it has been found that a polyamideimide elastomer comprising polyoxyethylene glycol as the soft segment and a polyamideimidedicarboxylic acid obtained from caprolactam and a tribasic or tetrabasic aromatic polycarboxylic acid capable of forming at least one imide ring, such as trimellitic acid or pyromellitic acid, as the hard segment has a good compatibility with vinyl resins and a good thermal resistance, and can exhibit an excellent antistatic effect, even when present in a relatively small amount.

Further, it has been found that the thermal resistance and the melting point of said polyamideimide elastomer depend mainly on the proportion and the molecular weight of the hard segment, that an elastomer obtained by using a polyamideimide-dicarboxylic acid partly modified with a diamine or diisocyanate also has a good affinity for vinyl resins and a good thermal resistance, that said elastomer gives vinyl resin compositions of a satisfactory rigidity and, when combined with acrylic resins, yields transparent compositions, and that the antistatic property of said composition can be further improved by incorporating therein a specific proportion of a specified compound. The present invention has been accomplished on the basis of above findings.

Thus, the present invention provides a vinyl resin composition which comprises 100 parts by weight of a resin composition comprising (A) 97–70% by weight of a vinyl polymer and
(B) 3–30% by weight of a polyamideimide elastomer obtained from
 a) caprolactam,
 b) a tribasic or tetrabasic aromatic polycarboxylic acid capable of forming at least one imide ring,
 c) polyoxyethylene glycol or a mixture of at least 50% by weight of polyoxyethylene glycol and a polyoxyalkylene glycol other than polyoxyethylene glycol, and
 d) 0–0.5 mole of a diamine or diisocyanate compound per 1 mole of the glycol of the component c), the glycol component c) being present in a proportion of 85–30% by weight in the elastomer and the relative viscosity of said elastomer being at least 1.5 at a temperature of 30° C., and
(C) 0–10 parts by weight of at least one electrolyte selected from organic electrolytes or inorganic electrolytes.

BEST MODE FOR CARRYING OUT THE INVENTION

The present invention will be described in detail below.

The vinyl resins (A) used in the present invention include styrene resins and acrylic resins. As examples of styrene resins, mention may be made of rubber-modified polystyrene resin, styrene-butadiene-acrylonitrile copolymer (ABS resin), styrene-rubber copolymer-methyl acrylate or -methyl methacrylate (MBS resin), styrene-acrylonitrile copolymer (AS resin), and random, block or graft polymer obtained from styrene monomer as the main component and copolymerizing therewith another vinyl monomer, such as methyl methacrylate, methyl acrylate, maleimide, acrylamide, etc.

Further, there may be used styrene resins incorporated with other thermoplastic resins, for example, blends of rubber-reinforced styrene resin with styrene-butadiene copolymer or hydrogenated styrene-butadiene copolymer, polyblends of ABS resin with polycarbonate resin, polyblends of ABS resin with acrylic resin, and polyblends of ABS resin with vinyl chloride resin.

Said rubber-reinforced polystyrene resin used in the present invention is produced, commercially, by dissolving a rubber-like substance in styrene monomer and subjecting the resulting solution to bulk or suspension polymerization. The rubber-like substances used are polybutadiene, styrenebutadiene copolymer, and the like. They are usually dispersed in styrene resin as particles of an average particle diameter of 0.5–5 $\mu$m.

Further, resins obtained by substituting a part of the styrene units constituting the abovementioned styrene resins with $\alpha$-methylstyrene, p-methylstyrene and p-t-butylstyrene units or such which may also be used.

Styrene resins containing carboxyl, epoxy, oxazoline, amide, imide, hydroxyl, amino, and the like, may also be favorably used to improve their affinity for polyamideimide elastomers. There is no particular restriction as to the method for introducing these functional groups into styrene resins. It may be performed by adding a monomer having a functional group and capable of copolymerizing with styrene monomer, for example, acrylic acid, methacrylic acid, fumaric acid, maleic acid, 2-hydroxyethyl methacrylate, 2-hydroxyethyl acrylate, 3-hydroxypropyl methacrylate, maleic anhydride, iraconic anhydride, chloromaleic anhydride, 2-isopropylaminoethylstyrene, aminoethyl acrylate, aminopropyl methacrylate, vinyloxazoline, glycidyl methacrylate, glycidyl acrylate, etc. and copolymerizing at the time of polymerization of the above-mentioned styrene resins, or by blending the copolymerization products of these monomers with styrene into said styrene resins.

Though it is not definitely clear through what mechanism the antistatic effect is exhibited when these functional group-containing styrene resins are blended with polyamideimide elastomer. It has been found that such blends undergo no laminar peeling, show an appropriate degree of compatibility not reaching complete mutual solubility between the two components, and express excellent antistatic effect and mechanical properties.

The content of the functional groups contained in said functional group-containing styrene resins is selected in the range of 0.05-10% by weight, preferably 0.1-5% by weight. When the content is less than 0.05% by weight the effect of improving mechanical properties cannot be exhibited sufficiently, whereas when it exceeds 10% by weight the antistatic effect is lowered.

The carboxyl group exerts a particularly strong action toward improving compatibility. The content of carboxyl groups in the styrene resin is preferably 0.05-4% by weight, more preferably 0.1-2% by weight. When the carboxyl group content is less than 0.05% by weight, the affinity of the resin for elastomers with a high polyamideimide content, particularly elastomers containing 60% by weight or more of polyamideimide decreases, leading to a decrease in impact resistance and a decrease in elongation. On the other hand, when the content is higher than 4% by weight, the affinity for polyamideimide elastomer increases, resulting in an extremely fine dispersion of the elastomer, and the blend approaches a state of complete mutual dissolution. Resin blends in such a condition exhibit an antistatic effect with difficulty.

Acrylic resins which may be used as component (A) in the present invention are, for example, polymethyl methacrylate (MMA resin), rubber-reinforced polymethyl methacrylate, methyl methacrylate-butadiene-styrene copolymer (MBS resin), methyl methacrylate-acrylonitrile-butadiene-styrene copolymer (MABS resin), and polymers obtained by copolymerizing 60% by weight or more of methyl methacrylate and 40% or less of another copolymerizable vinyl monomer. These resins may be used alone or in combinations of two or more. Examples of said copolymerizable vinyl monomer include ethyl methacrylate, butyl methacrylate, cyclohexyl methacrylate, 2-ethylhexyl methacrylate, methyl acrylate, ethyl acrylate, butyl acrylate, 2-ethylhexyl acrylate, styrene, α-methylstyrene, acrylonitrile, acrylic acid, methacrylic acid, fumaric acid, maleic acid and itaconic acid.

The polyamideimide elastomer of component (B) of the present composition is a multi-block type copolymer obtainable from a mixture of (a) caprolactam, (b) a tribasic or tetrabasic polycarboxylic acid, (c) polyoxyethylene glycol or a polyoxyalkylene glycol comprising polyoxyethylene glycol as the main component and optionally (d) a diamine or a diisocyanate, polyamideimide constituting the hard segment being formed of components (a), (b) and (d) and said hard segments being connected through an ester linkage to the glycol of the component (c) constituting the soft segment.

As component (b), there are used tribasic or tetrabasic aromatic carboxylic acids capable of forming at least one imide ring through a reaction with amino group(s) or the anhydrides thereof.

Specific examples of tricarboxylic acids include 1,2,4-trimellitic acid, 1,2,5-naphthalenetricarboxylic acid, 2,6,7-naphthalenetricarboxylic acid, 3,3',4-diphenyltricarboxylic acid, benzophenone-3,3',4-tricarboxylic acid, diphenyl sulfone-3,3',4-tricarboxylic acid, and diphenyl ether-3,3',4-tricarboxylic acid.

Specific examples of tetracarboxylic acids include pyromellitic acid, diphenyl-2,2',3,3'-tetracarboxylic acid, benzophenone-2,2',3,3'-tetracarboxylic acid, and diphenyl ether-2,2'-3,3'-tetracarboxylic acid.

These polycarboxylic acids are used in a substantially equimolar amount, namely in the range of 0.9-1.1 times by mole, relative to the sum of glycol component (c) and diamine or diisocyanate component (d).

Examples of the diamines or diisocyanates used as component (d) include ethylenediamine, tetramethylenediamine, hexamethylenediamine, phenylenediamine, 4,4'-diphenylmethanediamine, hexamethylene diisocyanate, phenylene diisocyanate, tolylene diisocyanate and diphenylmethane diisocyanate. The introduction of these makes it possible to increase the number of imide rings in the hard segments and thereby improve the thermal resistance, lower the melting point by copolymerization and control the thermal stability in kneading and the flow characteristics in kneading and molding. The amount of the diamine or diisocyanate of component (d) to be used should be 0.5 mole or less relative to 1 mole of glycol component (c). When the amount is larger than said value, a homogeneous elastomer can be difficultly obtained and the compatibility with vinyl resins becomes low.

Polyamideimide of the hard segment is related to the thermal resistance, strength and hardness of the elastomer and compatibility with vinyl resins. The content of polyamideimide in the elastomer should be in the range of 15-70% by weight. When the content is less than 15% by weight the elastomer has a low strength, and gives a product of low impact strength when blended with vinyl resin. A content exceeding 70% by weight results in poor compatibility or low antistatic effect.

The effect of said hard segment content is particularly large in the case of an acrylic resin. For example, to maintain the transparency of MMA resin when blended with said elastomer, the content of the hard segment is preferably 35% by weight or less.

The number average molecular weight of polyamideimide is preferably not less than 500 and not more than 3,000, more preferably not less than 500 and not more than 2,000. When the number average molecular weight of polyamideimide is less than 500 the melting point is lowered and the thermal resistance is decreased, whereas when it exceeds 3,000 compatibility with vinyl resins is lowered.

The components (c) used in the polyamideimide elastomer are polyoxyethylene glycol or mixtures of polyoxyethylene glycol with polyoxyalkylene glycols other than polyoxyethylene glycol.

The number average molecular weight of polyoxyethylene glycol used is not critical, but preferably in the range of 500-5,000. When it is less than 500, it may lead to a low melting point and as a result to an insufficient thermal resistance, although also depending on the composition of the elastomer. When it exceeds 5,000 a tough elastomer is formed with difficulty, which may result in low impact strength and low rigidity of the product when the elastomer is blended with vinyl resins.

Examples of polyoxyalkylene glycols which can be used in combination with polyoxyethylene glycol include polyoxytetramethylene glycol, modified polyoxytetramethylene glycol and polyoxypropylene glycol which have a number average molecular weight of 500–5,000, the proportion thereof in the glycol component being less than 50% by weight.

Said modified polyoxytetramethylene glycol may be products obtained by substituting a part of —(CH$_2$)$_4$—O— in usual polyoxytetramethylene glycol with —R—O—, wherein R is an alkylene group of 2–10 carbon atoms, e.g., the ethylene group, 1,2-propylene group, 1,3-propylene group, 2-methyl-1,3-propylene group, 2,2-dimethyl-1,3-propylene group, pentamethylene group, hexamethylene group, etc. The amount of modification is not critical but is usually selected from the range of 3 –50% by weight. Said amount of modification and the type of alkylene groups are appropriately selected depending on the properties required for the resulting vinyl resin compositions, e.g., low temperature impact resistance, thermal resistance, etc.

The modified polyoxytetramethylene glycol can be prepared, for example, by copolymerization of tetrahydrofuran with a diol using a heteropolyacid as the catalyst or copolymerization of a diol or a cyclic ether which is the condensation product of a diol, with butandiol.

The method for production of the polyamideimide elastomer used in the present composition is not particularly limited so long as it can produce a homogeneous amideimide elastomer. The following method may be used, for example.

This method comprises mixing caprolatam component (a), aromatic polycarboxylic acid component (b) and glycol component (c) in such a proportion that component (b) and component (c) are substantially equimolar, and polymerizing the mixture at 150°–300° C., preferably 180°–280° C., while maintaining the water content of the polymer formed at 0.1–1% by weight. In the dehydration condensation of this method, the reaction temperature may also be elevated stepwise.

In the reaction some of the caprolactam used remains unreacted, and is distilled off from the reaction mixture under reduced pressure. The reaction mixture thus freed of unreacted caprolactam may be further polymerized, according to necessity, by being subjected to post-polymerization under reduced pressure at 200°–300° C., preferably 230°–280° C.

In the above-mentioned method of reaction, esterification and amidation are made to take place simultaneously during the course of dehydration condensation, whereby the separation of coarse phases is prevented and resulting in a homogeneous and transparent elastomer being formed. For this reason, the elastomer is excellent in compatibility with vinyl resins and, when blended with vinyl resins, exhibits an excellent antistatic effect and excellent mechanical properties, and further it can give a transparent composition with acrylic resins.

In order to make the reaction of esterification and the polymerization of caprolactam take place simultaneously and to control respective reaction velocities thereby to obtain transparent and homogeneous elastomers, it is preferable to perform the polymerization while maintaining the water content of the reaction system in the range of 0.1–1% by weight by removing water formed away from the reaction system. When the water content exceeds 1% by weight the polymerization of caprolactam takes place preferentially to cause coarse phase separation. When the content is less than 0.1% by weight, on the other hand, esterification takes place preferentially while the reaction of caprolactam cannot proceed and consequently an elastomer of desired composition cannot be obtained. The water content is appropriately selected in the above-mentioned range according to the properties desired for the elastomer.

In the above reaction, the water content of the reaction system may be, as desired, also decreased gradually with the progress of the reaction. The control of the water content can be effected, for example, by the control of reaction conditions, e.g., the reaction temperature, the flow rate of inert gas introduced, and the degree of pressure reduction, or the modification of the reactor structure.

Although the degree of polymerization of the polyamideimide elastomer used in the present composition may be varied as desired according to necessity, it is preferably selected so as to give a relative viscosity of at least 1.5 as determined at a concentration of 0.5% (weight/volume) in m-cresol at 30° C. When the viscosity is lower than 1.5 the elastomer cannot exhibit satisfactory mechanical properties and, also when blended with vinyl resins, often shows unsatisfactory mechanical properties. A preferable relative viscosity is at least 1.6.

When a diamine or a diisocyanate (d) is used together, the reaction may be conducted by either a one step method or a two step method. The former method comprises simultaneously charging and reacting caprolactam (a), polycarboxylic acid component (b), glycol component (c), and diamine or diisocyanate component (d). The latter method comprises first reacting polycarboxylic acid component (b) and diamine or diisocyanate component (d) and then adding caprolactam (a) and glycol component (c) thereto and reacting the resulting mixture.

In the production of the polyamideimide elastomer, an esterification catalyst may be used as a polymerization accelerator.

Examples of preferred polymerization accelerators include phosphorus compounds such as phosphoric acid, polyphosphoric acid, and metaphosphoric acid; tetraalkyl orthotitanates such as tetrabutyl orthotitanate; tetraalkoxyzirconium such as tetrabutylzirconium; tin-containing catalysts such as dibutyltin oxide and dibutyltin laurate; manganese-containing catalysts such as manganese acetate; antimony-containing catalysts such as antimony trioxide; lead-containing catalysts such as its acetate. The catalyst may be added at either the initial stage or the middle stage of polymerization.

Stabilizers including various thermal age resisters and antioxidants can be used to enhance the thermal stability of the polyamideimide elastomer obtained. These stabilizers may be added in any of the initial, middle and last stages of polymerization. They may be added also after polymerization and before blending with vinyl resins.

Examples of heat stabilizers mentioned above include various hindered phenols such as N,N'-hexamethylenebis(3,5-di-t-butyl-4-hydroxycinnamamide), 4,4'- bis(2,6-di-t-butylphenol), and 2,2'-methylenebis(4-ethyl-6-butylphenol); aromatic amines such as N,N'-bis(β-naphthyl)-p-phenylenediamine N,N'-diphenyl-pphenylenediamine, and poly(2,2,4-trimethyl-1,2-dihydroquinoline); copper salts such as copper chloride and copper iodide; sulfur compounds such as dilauryl thiodipropionate; phosphorus compounds, etc.

The ratio of the vinyl resin of component (A) to the polyamideimide elastomer of component (B) in the present composition should be in the range of 70:30 to 97:3 by weight. When the ratio of component (B) is lower than said value a sufficient antistatic effect cannot be obtained, whereas when it is higher than the value the rigidity becomes insufficient.

It has been revealed that, in the present composition, a prominent synergistic effect is exhibited in antistatic effect when an electrolyte such as sodium dodecylbenzene sulfonate is used in combination with the polyamideimide elastomer.

Examples of organic electrolytes which show such an effect are organic compounds having an acidic group or the metal salts thereof, organic ammonium salts, or organic phosphonium salts, etc. Specific examples of said organic compound having an acidic group or the metal salts thereof include aromatic sulfonic acids such as dodecylbenzenesulfonic acid, p-toluenesulfonic acid, dodecyldiphenyl ether disulfonic acid, naphthalenesulfonic acid, condensation products of naphthalenesulfonic acid with formaline, and polystyrenesulfonic acid; alkylsulfonic acids such as laurylsulfonic acid; organic carboxylic acids such as stearic acid, lauric acid and polyacrylic acid; organic phosphoric acids such as diphenyl phosphite and diphenyl phosphate; and the alkali metal salts and the alkaline earth metal salts thereof.

Although the organic electrolytes also exhibit their effect in the form of free acids, they are preferably used in the form of alkali metal salts or alkaline earth metal salts, for example sodium, lithium, potassium, magnesium and calcium salts.

Specific examples of organic ammonium salts are quaternary ammonium salts, such as trimethyloctylammonium bromide, trimethyloctylammonium chloride, cetyltrimethylammonium bromide, cetyltrimethylammonium chloride, and trioctylmethylammonium bromide. Those of organic phosphonium salts are quaternary phosphonium salts, such as amyltriphenylphosphonium bromide and tetrabutylphosphonium bromide.

The inorganic electrolytes may be the nitrates, hydroxides, halides, rhodanates, sulfates, phosphates, carbonates, etc., of metals of the groups Ia, Ib, IIa, IIb, VIIa and VIII. Specific examples thereof include $AgNO_3$, $Ca(NO_3)_2$, $KBr$, $KNCS$, $KNO_3$, $LiNO_3$, $LiCl$, $NaBr$, $Na_2CO_3$, $NaH_2PO_4$, $Cu(NO_3)_2$, $ZnSO_4$, $Zn(NO_3)_2$, $MgCl_2$, $Mg(NO_3)_2$, $MnCl_2$ and $Ni(NO_3)_2$.

When styrene resin is used as the vinyl resin in the present composition, the electrolyte to be used can be selected as desired from those mentioned above depending on the composition of styrene resin and polyamideimide elastomer, intended uses, etc. When acrylic resin is used as the vinyl resin, organic sulfonic acid salts are preferably selected.

The amount of these electrolytes to be added is selected from the range of usually 0.01–10 parts by weight, preferably 0.1–5 parts by weight, relative to 100 parts by weight of the sum of components (A) and (B). When the amount is less than 0.01 part by weight the effect of the additive is not exhibited sufficiently. When it exceeds 10 parts by weight, it causes lowering of impact strength, corrosion of molds, development of mold deposits, deterioration of appearance, etc.

Among the electrolytes mentioned above, organic electrolytes are preferred to inorganic electrolytes from the viewpoint of corrosion of molds and the appearance of products.

The composition of the present invention may be incorporated as desired, within limits not deleterious to the object of the present invention, with various additive ingredients, for example pigments, dyes, reinforcing fillers, thermal stabilizers, antioxidants, nucleating agents, lubricants, plasticizers, ultraviolet absorbers, mold release agents, flame retardants, and other polymers, in any desired process steps such as the kneading step, molding step, etc.

As examples of the reinforcing filler, mention may be made of fibrous reinforcements such as glass fiber, carbon fiber and potassium titanate, and granular or flake-like fillers such as mica, talc, clay, calcium silicate, calcium carbonate, glass foil, glass beads, and other polymers. Particularly preferred among these are glass fiber and mica.

When flame resistance is to be imparted to the vinyl resin composition of the present invention, a flame retardant can be added thereto. Flame retardants which may be used include organic halogen-containing, organic phosphorus-containing, metal hydroxide-based flame-retardants etc., and those conventionally used in styrene resins.

The amount of said organic halogen-containing, organic phosphorus-containing or metal hydroxide-based flame retardants to be added to the vinyl resin composition is selected from the range of usually 4–35 parts by weight, preferably 10–25 parts by weight, relative to 100 parts by weight of the vinyl resin composition.

Flame retarding auxiliaries which have the capability of enhancing the effect of the abovementioned flame retardant can be used. Specific examples of the flame retarding auxiliary include molybdenum compounds such as molybdenum trioxide and ammonium molybdate, and antimony compounds such as antimony trioxide. Particularly preferred is antimony trioxide. The amount of the flame retarding auxiliary to be added is usually selected from the range of 2–10 parts by weight relative to 100 parts by weight of the vinyl resin composition.

The composition of the present invention can be prepared from a mixture comprising said component (A), component (B), and optionally used electrolytes and various additives by conventional methods, for example by kneading the mixture with a Banbury mixer, mixing roll, single- or twin-screw extruder, etc. The kneading is preferably conducted at a temperature range of 180°–280° C.

For electrolytes which have a high melting point, it is advantageous to dissolve the electrolyte in a solvent, such as water, an alcohol and dimethylformamide, in advance and then feeding the resulting solution dropwise into the vent port of the extruder causing the electrolyte to thereby be dispersed uniformly and a composition which has good antistatic effect, mechanical properties and appearance can be obtained.

The vinyl resin composition thus obtained can be formed by known methods conventionally used in forming thermoplastic resins, for example, injection molding, extrusion, blow molding, vacuum forming, etc.

EFFECT OF THE INVENTION

The vinyl resin composition of the present invention comprises styrene resin or acrylic resin and polyamideimide elastomer as essential resin components and is featured by having a permanent antistatic property and excellent mechanical properties. Accordingly, it is in wide use as a molding material capable of preventing electrostatic charge for various parts of electronic devices, household appliances, office automation equipment etc., including video casettes, video disks, cleaners, televisions, copying machines in the case of compositions based on styrene resins, and lighting fixtures, meter covers, etc., in the case of those based on acrylic resins by virtue of their transparency.

EXAMPLE

The present invention will be described further in detail below with reference to Examples, but it is in no way limited thereto.

The properties of the composition and the elastomer were determined according to the methods shown below.

(1) Tensile were determined according to ASTM D638 by use of dumbbell specimens of ⅛ inch thickness at 23° C. and 55% RH.

Since many of the elastomers have no yield point, the tensile strength and elongation were determined by use of dumbbell specimens of 1 mm thickness at the absolute dry state.

(2) Flexural modulus

This was determined according to ASTM D790 by use of test pieces of ⅛ inch thickness at 23° C. and 55% RH.

(3) Izod impact strength

This was determined according to ASTM D-256 by use of test pieces with notch of ⅛ inch thickness at 23° C. and 55% RH.

(4) Charge voltage test

A static voltage of 8 KV was applied to the specimen by use of a Static Honest Meter (mfd. by Shishido Shokai) and the time until the reduction by half of the charge voltage of the specimen after removal of the applied voltage was determined at 23° C. and 55% RH.

(5) Surface resistivity

This was determined by use of plates of ⅛ inch thickness with an Ultra Megohmmeter SM-10E (mfd. by Toa Denpa Kogyo K.K.) under the following conditions.

(a) Measured after conditioning at 23° C. and 55% RH for 24 hours, after molding.

(b) Measured after immersion in running water for 10 minutes, removal of surface water, and conditioning at 23° C. and 55% RH for 24 hours, after molding.

(6) Relative viscosity of elastomer

This was determined under conditions of 0.5% (wt/vol) in m-cresol at 30° C.

(7) Thermal decomposition temperature of elastomer

The temperature at which the specimen shows a specified weight decrease was determined by differential thermal analysis at a temperature-increasing rate of 10° C./min.

Test pieces used for determination of properties were prepared by molding the pellets obtained in Examples and Comparative Examples into plates of ⅛ inch thickness (90 mm in length and 50 mm in width) and test pieces of ⅛ inch thickness with an injection machine.

The following styrene resins, acrylic resins and additives were used in Examples and Comparative Examples.

- A-1: A styrene resin containining 12% by weight of butadiene rubber
- A-2: A styrene resin (having a melt flow rate of 2.3 g/10 mm as determined at 200° C. and 5 kg)
- A-3: A styrene resin containing 8% by weight of methacrylic acid copolymerized therein.
- A-4: An ABS resin, Stylac ABS A-4130 (mfd. by Asahi Chemical Industry Co., Ltd.)
- A-5: An AS resin, Stylac AS (mfd. by Asahi Chemical Industry Co., Ltd.)
- A-6: A styrene-methyl methacrylate-methacrylic acid (60:30:10) copolymer
- A-7: A polystyrene resin containing 1% by weight of oxazoline groups (XUS-40056-01, mfd. by Dow Chemical Co.)
- A-8: A polystyrene resin containing 15% by weight of 2-hydroxyethyl methacrylate copolymerized therein
- A-9: A polymethyl methacrylate containing 5% by weight of glycidyl methacrylate copolymerized therein
- A-10: A methyl methacrylate resin, Delpet 8 ON (mfd. by Asahi Chemical Industry Co., Ltd.)
- A-11: A copolymer resin of 90 parts by weight of methyl methacrylate and 10 parts by weight of methacrylic acid
- A-12: A copolymer resin of 70 parts by weight of methyl methacrylate, 15 pats by weight of styrene and 15 parts by weight of acrylonitrile
- A-13: A copolymer resin of 85 parts by weight of methyl methacrylate and 15 parts by weight of ethyl acrylate
- C-1: Sodium dodecylbenzenesulfonate
- C-2: Sodium dodecyldiphenyl ether-disulfonate
- C-3: Sodium dodecyldiphenyl ether-disulfonate
- C-3: Potassium bromide
- C-4: Potassium thiocyanate
- C-5: Sodium stearate
- C-6: Amylphenylphosphonium bromide
- C-7: Tetrabutylammonium chloride
- C-8: Sodium polyacrylate
- C-9: Sodium laurylsulfate Preparation Example 1

Preparation of polyamideimide elastomer (B-1)

In a 10 l SUS reactor equipped with a stirrer, nitrogen inlet and distilling-out tube were placed 2,680 g of polyoxyethylene glycol (number average molecular weight: 1,980), 259.4 g of trimellitic anhydride, 1,707 g of caprolactam and 8.0 g of a 1:1 blend of pentaerythrityl-tetrakis[3-(3,5-di-t-butyl-4-hydroxyphenyl)propionate] with tris(2,4-di-t-butylphenyl)phosphite (Irganox B 225, a trade name, an antioxidant), then the inner pressure was reduced to 1 Torr at 100° C., and the above mixture was stirred for 1 hour to remove the moisture in the raw materials. Thereafter, while introducing nitrogen and maintaining the inner pressure at 300 Torr, the mixture was heated at 260° C. and polymerized for 4 hours. Then, the pressure was gradually reduced at the same temperature to distill off unreacted caprolactam.

Subsequently, nitrogen was again introduced to keep the pressure at 200 Torr, a solution of 4.0 g of tetrabutyl orthotitanate in 100 g of caprolactam was added to the above polymerization mixture, then the pressure was reduced to 1 Torr, and polymerization was conducted at the same temperature for 7 hours. The polymer thus obtained was extruded in the form of gut onto a cooling belt and pelletized to give a pellet-formed elastomer.

The elastomer was pale brown and transparent, had a polyoxyethylene glycol content of 67% by weight and a relative viscosity of 2.18, and showed a tensile strength and elongation of 310 kg/cm$^2$ and 850%, respectively.

The thermal decomposition initiation temperature, 10% weight decrease temperature and 30% weight decrease temperature of the elastomer were 353° C., 377° C. and 394° C., respectively.

Preparation Example 2

Preparation of polyamideimide elastomer (B-2)

In a 50 ml separable flask equipped with a stirrer, nitrogen inlet and distilling-out tube were placed 144 g of polyoxyethyleneglycol (number average molecular weight: 2,010), 13.7 g of trimellitic anhydride, 68.2 g of caprolactam and 0.4 g of poly(2,2,4-trimethyl-1,2-dihydroquinoline) (Noclac 224, a trade name, an antioxidant), and the resulting mixture was removed of water by reducing the inner pressure to 1 Torr or less for 30 minutes while stirring the mixture at 100° C. Then the pressure was returned to normal pressure, and the mixture was heated to 260° C. while nitrogen was being passed through the reactor at a rate of 60 ml/minute and polymerized for 4 hours. Thereafter the pressure was reduced gradually at the same temperature to distill unreacted caprolactam out of the reaction system.

The 0.4 g of tetrabutyl orthotitanate was added to the system, the pressure was reduced to 1 Torr, and polymerization was conducted for 7 hours to obtain a pale yellow, transparent elastomer.

The elastomer had a content of polyoxyethylene glycol of 72% by weight, a number average molecular weight of polyamideimide of 80 and a relative viscosity of 2.25, and showed a tensile strength and elongation of 290 kg/cm$^2$ and 1,200%, respectively.

The thermal decomposition initiation temperature, 10% weight decrease temperature and 30% weight decrease temperature were 350° C., 425° C. and 443° C., respectively.

The water contents in the polymerization system 1, 2 and 4 hours after the initiation of reaction at 26° C. were 0.7% by weight, 0.6% by weight and 0.6% by weight, respectively.

Preparation Examples 3–8:

Preparation of polyamideimide elastomers (B-3 to B-7) and polyamide elastomer (B-8)

Polyamideimide elastomers and a polyamide elastomer having compositions shown in Table 1 were prepared in the same manner as in Preparation Example 2.

In Preparation Example 5, tetrabutoxyzirconium was used in place of tetrabutyl orthotitanate. In Preparation Example 7, 0.1% by weight of antimony trioxide was charged to effect reaction and, after distilling caprolactam off, polymerization was conducted by use of 0.1% by weight of tetrabutyl orthotitanate. In Preparation Example 6, polyoxytetramethylene glycol (PTMG) was used as a part of the glycol component.

The neopentyl glycol-modified polyoxytetramethylene glycol (abbreviated as NPG-modified PTMG) used in Preparation Example 7 was prepared in the following manner.

In a vessel equipped with a stirrer and reflux condenser were placed 600 g of tetrahydrofuran (THF) and 70.5 g of neopentyl glycol and 300 g of anhydrous tungstophosphoric acid (H$_3$PW$_{12}$O$_{40}$), which was heated at 250° C. for 3 hours. After 7 hours of stirring at a temperature of 60° C. under nitrogen, the reaction mixture was allowed to stand at room temperature to separate into two layers. Unreacted THF was removed by distillation from the upper layer to obtain 142 g of a transparent viscous polymer.

Determination of the hydroxyl group showed that the polymer had a number average molecular weight of 1,060 and was a copolymer glycol of a molar ratio of THF: neopentyl glycol of 5:1.

The results thus obtained are shown in Tables 1 and 2 below.

TABLE 1

| Preparation Example No. | Elastomer | Glycol component I | Glycol component II | I/II weight ratio | Carboxylic acid | Glycol content (wt %) |
|---|---|---|---|---|---|---|
| 3 | B-3 | PEG $\overline{Mn}$ 1480 | — | — | Trimellitic acid | 60 |
| 4 | B-4 | PEG $\overline{Mn}$ 1000 | — | — | Trimellitic anhydride | 50 |
| 5 | B-5 | PEG $\overline{Mn}$ 1980 | — | — | Pyromellitic anhydride | 73 |
| 6 | B-6 | PEG $\overline{Mn}$ 1980 | PTMG $\overline{Mn}$ 1980 | 70/30 | Trimellitic anhydride | 67 |
| 7 | B-7 | PEG $\overline{Mn}$ 1980 | NPG-modified PTMG $\overline{Mn}$ 1970 | 80/20 | Benzophenone-tetracarboxylic acid anhydride | 58 |
| 8 | B-8 | PTMG $\overline{Mn}$ 1980 | — | — | Adipic acid | 67 |

TABLE 2

| Elastomer | Relative viscosity | Strength (kg/cm$^2$) | Elongation (%) | Thermal decomposition temp. (°C.) | 10% Weight decrease temp. (°C.) | 30% Weight decrease temp. (°C.) |
|---|---|---|---|---|---|---|
| B-3 | 1.84 | 280 | 1050 | 366 | 387 | 407 |
| B-4 | 2.04 | 560 | 900 | 350 | 385 | 405 |
| B-5 | 1.93 | 275 | 1080 | 336 | 436 | 452 |
| B-6 | 2.09 | 315 | 980 | 340 | 385 | 418 |

TABLE 2-continued

| Elastomer | Relative viscosity | Strength (kg/cm$^2$) | Elongation (%) | Thermal decomposition temp. (°C.) | 10% Weight decrease temp. (°C.) | 30% Weight decrease temp. (°C.) |
|---|---|---|---|---|---|---|
| B-7 | 1.81 | 330 | 890 | 331 | 382 | 410 |
| B-8 | 1.97 | 345 | 930 | 283 | 374 | 403 |

Preparation Example 9

Preparation of polyamide elastomer (B-9)

In the same apparatus as that used in Preparation Example 2 except that the distilling-out tube was replaced by a reflux condenser, were placed 167 g of caprolactam, 33.2 g of adipic acid and 6 g of water and reacted at 260° C. for 6 hours to obtain a carboxyl group-terminated polycapramide. The number average molecular weight of the polycapramide was found to be 883 from the acid value determination.

In the same apparatus as that used in Preparation Example 2, were placed 40 g of the polyamide mentioned above, 96 g of polyoxyethylene glycol (number average molecular weight: 2,010), 0.3 g of an antioxidant [N,N-hexamethylene-bis(3,5-di-t-butyl-4-hydroxycinnamamide), trade name: Irganox 1,098] and 0.2 g of tetrabutyl orthotitanate, the resulting mixture was molten at 240° C. and then polymerized at a reduced pressure of 1 Torr at the temperature for 2 hours and further at 1 Torr and 260° C. for 9 hours. Resultantly, coarse phase separation occurred during polymerization.

The molten mixture assumed a milky white appearance and did not become transparent to the end of polymerization. The elastomer obtained was polar brown, opaque and britle.

The thermal decomposition initiation temperature, 10% weight decrease temperature and 30% weight decreased temperature of the elastomer were 291° C., 362° C. and 380° C., respectively.

Preparation Example 10

Preparation of polyamideimide elastomer (B-10)

In the same apparatus as that used in Preparation Example 2, were placed 40 g of caprolactam, 91 g of polyoxyethylene glycol (number average molecular weight: 2,040), 11.2 g of trimellitic anhydride, 1.5 g of hexamethylenediamine (molar ratio to polyoxyethylene glycol: 0.3), 0.15 g of phosphoric acid and 0.2 g of "Noclac 224" and the resulting mixture was allowed to react at 260° C. for 4 hours while nitrogen was being passed through the reactor at a rate of 70 /min. Then unreacted caprolactam was distilled off under reduced pressure, 0.3 g of tetraisopropyl orthotitanate was added to the reaction mixture, and the resulting mixture was reacted at 1 Torr for 5 hours to obtain a yellow transparent elastomer.

The elastomer had a polyoxyethylene glycol content of 72% by weight, relative viscosity of 1.90, tensile strength of 295 kg/cm$^2$ and tensile elongation of 1,020%. It showed a thermal decomposition initiation temperature, 10% weight decreases temperature and 30% weight decrease temperature of 350° C., 403° C. and 438° C., respectively.

Preparation Example 11

Preparation of polyamideimide elastomer (B-11)

In the same apparatus as that used in Preparation Example 2, were placed 95 g of caprolactam, 82.5 g of polyoxyethylene glycol having a number average molecular weight of 1,980, 8.8 g of trimellitic anhydride, 1.04 g of diphenylmethane diisocyanate and 0.3 g of "Irganox 1098", and the resulting mixture was molten at 150° C. while nitrogen was being passed at a rate of 50 ml/min. and then polymerized at 260° C. for 4 hours. Subsequently, 0.3 g of tetrabutyl orthotitanate was added, and then the pressure was gradually reduced down to 1 Torr to distill unreacted caprolactam out of the system. Polymerization was further conducted at the same temperature under a pressure of 1 Torr or less for 3 hours to obtain a transparent elastomer. The elastomer had a polyoxyethylene glycol content of 55% by weight, relative viscosity of 2.0, tensile strength of 380 kg/cm$^2$, elongation of 920%, and Shore hardness D of 34. It showed a thermal decomposition initiation temperature, 10% weight decrease temperature and 30% weight decrease temperature of 321° C., 380° C. and 405° C., respectively.

Preparation Example 12

Preparation of polyamideimide elastomer (B-12)

Reaction was conducted in the same manner as in Preparation Example 10 by use of 90 g of polyoxyethylene glycol having a number average molecular weight of 1,490, 67.4 g of caprolactam, 13.9 g of trimellitic anhydride and 2.0 g of hexamethylene diisocyanate to obtain a transparent elastomer having a polyoxyethylene glycol content of 60% by weight, relative viscosity of 1.95, tensile strength and elongation of 290 kg/cm$^2$ and 1,030%, respectively, and Shore hardness D of 27. The thermal decomposition initiation temperature, 10% weight decrease temperature and 30% weight decrease temperature of the elastomer were 335° C., 392° C. and 415° C., respectively.

Preparation Example 13

Preparation of polyamideimide elastomer (B-13)

In the same reactor as that used in Preparation Example 1 were placed 1.45 kg of caprolactam, 2.0 kg of polyoxyethylene glycol having a number average molecular weight of 1,480, 259 g of trimetallitic anhydride and 7 g of "Noclac 224", and the same procedures as in Preparation Example 1 were followed except that the fore stage reaction was conducted at 600 Torr, to obtain a transparent polyamideimide elastomer containing 60% by weight of polyoxyethylene glycol. The elastomer obtained had a relative viscosity of 2.15, tensile strength of 325 kg and elongation of 980%, and showed a thermal decomposition initiation temperature of 359° C., 10% weight decrease temperature of 390° C. and 30% weight decrease temperature of 409° C.

Examples 1–18

Styrene resins, elastomers and additives were mixed in the proportions shown in Table 3, kneaded and extruded through a single screw extruder (30 mm screw with dulmadge, L/D=26) at 2° C., then passed through a cooling bath and pelletized. The pellets thus obtained were dried in a Geer over at 80° C. for 3 hours and then injection-molded under the following conditions to prepare test pieces for property determination. All the test pieces showed excellent gloss.

Cylinder temperature: 250° C.
Mold temperature: 80° C.
Injection pressure: 700 kg/cm²
Injection time: 15 sec.
Cooling time: 15 sec.

The results of property determination are shown in Table 3.

Comparative Examples 1–4

Styrene resins, or styrene resins and elastomers, were blended in the proportions shown in Table 3, and the properties of the blends were determined in the same manner as in Examples 1–18. The results are shown in Table 3 below.

truded through a single screw extruder (30 mm screw with dulmadge, L/D=26) at 250° C., then passed through a cooling bath and pelletized. The pellets obtained were dried in a Geer oven at 80° C. for 3 hours and then injection-molded under the following conditions to prepare test pieces for property determination. All the test pieces showed excellent gloss.

Cylinder temperature: 250° C.
Mold temperature: 80° C.
Injection pressure: 700 kg/cm²
Injection time: 15 sec.
Cooling time: 15 sec.

The results of property determination are shown in Table 4.

Comparative Examples 5–8

Acrylic resins, or acrylic resins and elastomers, were blended in the proportions shown in Table 4, and the properties of the blends were determined in the same manner as in Examples 19–25. The results of property determination are shown in Table 4.

TABLE 3

| | Composition of resin composition | | | | | Additive | | Property of resin composition | | | | |
|---|---|---|---|---|---|---|---|---|---|---|---|---|
| | Elastomer | | Vinyl resin | | | | | Withstand voltage test (sec) | Izod impact strength (kg·cm/cm) | Flexural modulus (kg/cm²) | Strength (kg/cm²) | Appearance |
| | Name | Part by wt. | X | Y | Z | Part by wt. X/Y/Z | Kind | Part by wt. | | | | |
| Example | | | | | | | | | | | | |
| 1 | B-1 | 10 | A-1 | A-2 | — | 45/45/0 | — | 0 | 2 | 9.5 | 23000 | 360 | |
| 2 | B-1 | 8 | A-1 | A-2 | A-3 | 46/34.4/11.6 | — | 0 | 10 | 11.5 | 23300 | 365 | Glossy, good |
| 3 | B-1 | 8 | A-1 | A-2 | A-3 | 46/34.4/11.6 | C-1 | 1.0 | 2 | 11.0 | 23200 | 360 | " |
| 4 | B-2 | 6 | A-1 | A-2 | — | 47/47/0 | — | 0 | 27 | 9.7 | 24300 | 362 | " |
| 5 | B-3 | 20 | A-1 | — | A-3 | 40/0/40 | — | 0 | 4 | 11.7 | 19500 | 325 | " |
| 6 | B-4 | 10 | A-1 | A-2 | — | 60/30/0 | C-2 | 0.5 | 2 | 14.2 | 21600 | 350 | " |
| 7 | B-5 | 10 | A-1 | A-2 | A-3 | 45/33.7/11.3 | C-3 | 0.5 | 2 | 8.3 | 19500 | 310 | " |
| 8 | B-6 | 10 | A-1 | A-2 | A-3 | 45/33.7/11.3 | C-4 | 0.3 | 2 | 10.3 | 21200 | 345 | " |
| 9 | B-7 | 12 | A-1 | A-2 | — | 44/44 | — | — | 4 | 10.1 | 22300 | 350 | " |
| 10 | B-10 | 12 | A-1 | A-7 | — | 44/44 | C-6 | 1.0 | 2 | 9.6 | 22100 | 305 | " |
| 11 | B-10 | 10 | A-1 | A-2 | A-3 | 45/33.7/11.3 | C-8 | 1.0 | 2 | 9.5 | 21000 | 310 | " |
| 12 | B-11 | 10 | A-1 | A-2 | A-3 | 45/33.7/11.3 | C-1 | 0.5 | 2 | 10.9 | 22500 | 355 | " |
| 13 | B-12 | 10 | A-1 | A-2 | A-3 | 45/33.7/11.3 | C-5 | 0.5 | 3 | 10.2 | 22300 | 350 | " |
| 14 | B-11 | 10 | A-1 | A-2 | A-9 | 54/27/9 | C-7 | 1.0 | 3 | 13.8 | 21200 | 345 | " |
| 15 | B-11 | 15 | A-1 | A-2 | — | 50/35/0 | C-2 | 0.2 | 2 | 12.1 | 20800 | 335 | " |
| 16 | B-1 | 10 | A-1 | A-2 | A-8 | 45/35/10 | C-1 | 0.3 | 3 | 10.1 | 23100 | 310 | " |
| 17 | B-1 | 18 | A-4 | — | — | 82/0/0 | — | 0 | 2 | 43 | 17500 | 320 | " |
| 18 | B-3 | 12 | A-5 | — | A-6 | 70.4/0/17.6 | — | 0 | 10 | 3.5 | 29500 | 620 | " |
| Comp. Example | | | | | | | | | | | | | |
| 1 | — | — | A-1 | A-2 | — | 50/50/0 | — | 0 | >3000 | 10.3 | 27600 | 377 | " |
| 2 | — | — | A-1 | A-2 | A-3 | 50/37.5/12.5 | — | 0 | >3000 | 9.6 | 26400 | 381 | " |
| 3 | B-8 | 10 | A-1 | A-2 | A-3 | 45/33.7/11.3 | — | 0 | 740 | 10.1 | 18200 | 290 | " |
| 4 | B-9 | 10 | A-1 | A-2 | A-3 | 45/33.7/11.3 | — | 0 | 35 | 2.3 | 21300 | 315 | Slightly poor gloss |

Examples 19–25

Acrylic resins, elastomers and additives were mixed in the proportions shown in Table 4, kneaded and ex-

TABLE 4

| | Resin composition | | | | | | | Property | | | | |
|---|---|---|---|---|---|---|---|---|---|---|---|---|
| | Elastomer | | Acrylic resin | | | | Additive | | Withstand voltage test (sec) | Flexural modulus (kg/cm²) | Strength (kg/cm²) | Elongation (%) | Appearance |
| | | | First component | | Second component | | | | | | | | |
| | Kind | Part by wt. | Kind | Part by wt. | Kind | Part by wt. | Kind | Part by wt. | | | | | |
| Example | | | | | | | | | | | | | |
| 19 | B-1 | 20 | A-10 | 80 | — | — | — | — | 3 | 24100 | 490 | 82 | Transprent |
| 20 | B-2 | 15 | A-10 | 85 | — | — | — | — | 20 | 28200 | 520 | 50 | Transprent |
| 21 | B-2 | 8 | A-10 | 92 | — | — | C-1 | 1.0 | 3 | 30200 | 635 | 44 | Transprent |
| 22 | B-3 | 10 | A-10 | 70 | A-11 | 20 | C-9 | 1.0 | 5 | 29000 | 530 | 53 | Translucent |
| 23 | B-4 | 10 | A-10 | 90 | — | — | C-2 | 1.0 | 4 | 30400 | 630 | 47 | " |
| 24 | B-6 | 20 | A-10 | 50 | A-12 | 30 | — | — | 12 | 24800 | 500 | 32 | Transprent |
| 25 | B-1 | 10 | A-13 | 90 | — | — | C-1 | 0.5 | 3 | 27800 | 535 | 47 | Transprent |

TABLE 4-continued

| | | | | | | | | | | Property | | | |
|---|---|---|---|---|---|---|---|---|---|---|---|---|---|
| | Resin composition | | | | | | | | | | | | |
| | Elastomer | | Acrylic resin | | | | Additive | | Withstand | Flexural | | Elonga- | |
| | | | First component | | Second component | | | | voltage | modulus | Strength | tion | |
| | Kind | Part by wt. | Kind | Part by wt. | Kind | Part by wt. | Kind | Part by wt. | test (sec) | (kg/cm²) | (kg/cm²) | (%) | Appearance |
| Comparative Example | | | | | | | | | | | | | |
| 5 | — | — | A-10 | 100 | — | — | — | — | >3000 | 34100 | 770 | 9 | Transparent |
| 6 | — | — | A-10 | 100 | — | — | C-1 | 1.0 | >3000 | 33000 | 735 | 8 | Transprent |
| 7 | B-8 | 20 | A-10 | 80 | — | — | — | — | >3000 | 24500 | 510 | 60 | Translucent |
| 8 | — | — | A-10 | 88 | A-11 | 12 | — | — | >3000 | 33800 | 750 | 10 | Transparent |

Example 26

The surface resistivities of the test pieces of Examples 1 and 3 were determined at 23° C. and 55% RH and found to be $4.3 \times 10^{11}$ Ω/□ and $2.5 \times 10^{11}$ Ω/□, respectively. The surface resistivities determined after standing under said conditions for 6 months were respectively $4.1 \times 10^{11}$ Ω/□ and $2.8 \times 10^{11}$ Ω/□, showing that the initial values were maintained.

Example 27

To a mixture of 10 parts by weight of the elastomer of Preparation Example 13 with respectively 45, 33.7, and 11.3 parts of styrene resins A-1, A-2 and A-3 was added 1 part by weight of sodium dodecylbenzenesulfonate per 100 parts by weight of the sum of elastomer and styrene resin, and the resulting mixture was kneaded under the same conditions as in Example 1 to obtain a resin composition, which was then injection-molded under the same conditions as in Example 1. The sample thus obtained showed a surface resistivity of $5.0 \times 10^{11}$ Ω/⅜ and a gloss of 90%.

To examine the thermal stability in injection molding, the resin composition was injection-molded after retention of 20 minutes at 250° C. in the cylinder. The surface of the molded piece was smooth and had a gloss of 87%, thus showing substantially no change.

For comparison, the resin composition of Comparative Example 4 was injection-molded in the same manner as in Example 1 at 250° C. and, separately, after retention of 20 minutes in the cylinder at 250° C. The test pieces thus obtained showed a gloss of 73% and 37%, respectively. The latter test piece somewhat developed surface roughness.

Example 28

The test piece prepared in Example 3 was immersed in running water for 1 day, then dried in vacuo at 80° C. and subjected to a withstand voltage test. The half value period of withstand voltage was found to be 3 sec, which was the same as that before water-washing.

Example 29

Injection-molded samples of Examples 19 and 21 were allowed to stand at 23° C. and 55% RH for 2 months and then subjected to a withstand voltage test. Both samples gave a value of 3 sec., thus showing no change. Separately, the samples allowed to stand for 2 months were wiped 20 times with cloth and subjected to a withstand voltage test. Both samples gave a value of 3 sec., thus showing no change.

Comparative Example 9

Twenty (20) parts by weight of a polyamide elastomer (B-9, polyoxyethylene glycol segment content: 69.5% by weight) and 80 parts by weight of an acrylic resin (A-1) were blended and injection-molded in the same manner as in Example 19. The injection-molded product gave a value of 3 sec. in the withstand voltage test but it was opaque and showed a low Izod impact strength of 1 kg.cm/cm. The Izod impact strength in Example 19 was 3 kg.cm/cm.

Example 30

To the composition of Example 21 were further added two kinds of ultraviolet absorbers, namely 0.1% by weight of 2-(5-methyl-2-hydroxyphenyl)benzotriazole (trade name: TINUVIN P, mfd. by Ciba Geigy Corp.) and 0.2% by weight of bis-[2,2,6,6-tetramethyl-4-piperidinyl] sebacate (trade name: SANOL LS-770, mfd. by Sankyo K.K.) and the resulting mixture was kneaded and injection-molded under the same conditions as in Example 21 to obtain a transparent test sample. The sample was subjected to a Sunshine weather meter test (continuous irradiation of repeated cycles each consisting of 48 minutes of irradiation at 40° C. and 72% RH and 12 minutes of irradiation under water spray) for 500 hours. The sample after irradiation maintained its transparency and showed only a little increase in yellowish color. The results of the withstand voltage test were 3 sec. before irradiation and 4 sec. after irradiation, thus showing almost no change in antistatic effect.

INDUSTRIAL APPLICABILITY

The vinyl resin composition according to the present invention has an excellent permanent antistatic property and can be used for parts of various electronic goods such as various office automation equipment and household appliances wherein prevention of electrostatic charge is required. In particular, when the composition is that based on acrylic resin, it can be also widely used for such uses as lighting fixtures, instrument nameplates, meter covers, etc. because it is inexpensive and excellent in transparency. When the composition is that based on styrene resins it is highly applicable also for video cassettes, IC cards, etc. because it is inexpensive and excellent in mechanical properties including mechanical strength and rigidity and in moldability.

We claim:

1. A vinyl resin composition which comprises
   (1) 1 100 parts by weight of a resin composition comprising (A) 97–70% by weight based on 100 parts by weight of said resin composition of a vinyl polymer and (B) 3–30% by weight based on 100 parts by weight of said resin composition of a polyamideimide elastomer obtained by reacting a) caprolactam, b) a tribasic or tetrabasic aromatic polycarboxylic acid capable of forming at least one imide ring, c) polyoxyethylene glycol or a mixture of at least 50% by weight of polyoxyethylene glycol and a polyoxyalkylene glycol other than polyoxyethylene glycol, and d) 0–0.5 mole of a diamine or diisocyanate compound per 1 mole of the glycol of component c), glycol component c) being present in a proportion of 85–30% by weight in the elastomer and the relative viscosity of said elastomer being at least 1.5 at a temperature of 30° C., and (2) 0–10 parts by weight based on 100 parts by weight of said resin composition of at least one electrolyte selected from organic electrolytes and inorganic electrolytes.

2. A vinyl resin composition according to claim 1, wherein the vinyl polymer (A) is a styrene resin.

3. A vinyl resin composition according to claim 2, wherein said styrene resin is a styrene resin containing a carboxylic group.

4. A vinyl resin composition according to claim 1, wherein the vinyl resin (A) is an acrylic resin.

5. A vinyl resin composition according to claim 4, wherein said acrylic resin is an acrylic resin containing a carboxylic group.

6. A vinyl resin composition according to claim 4, wherein the polyamideimide elastomer contains 85–65% by weight of polyoxyethylene glycol and the composition is transparent.

7. A vinyl resin composition according to any of claims 1–6, wherein there is used as the electrolyte at least one member selected from the group consisting of quaternary ammonium salts, organic phosphonium salts, aromatic sulfonic acids, alkali or alkaline earth metal salts thereof, alkyl sulfonic acids, alkali or alkaline earth metal salts thereof, organic carboxylic acids, alkali or alkaline earth metal salts thereof, organic phosphoric acids, alkali or alkaline earth metal salts thereof, NaBr, KBr, KNO$_3$ and LiNO$_3$.

8. A vinyl resin composition according to claim 7, wherein the electrolyte is an alkali or alkaline earth metal salt of an aromatic sulfonic acid or alkylsulfonic acid and the amount thereof is 0.1–5 parts by weight.

9. A vinyl resin composition according to claim 7 wherein hexamethylene diisocyanate or 4,4'-diphenylmethane diisocyanate is used as the diisocyanate compound.

10. A vinyl resin composition according to claim 7 wherein hexamethylene-diamine or 4,4'-diphenylmethylanediamine is used as the diamine compound.

11. A vinyl resin composition according to claim 7, wherein there is employed as a tribasic or tetrabasic aromatic polycarboxylic acid at least one member selected from the group consisting of 1,2,4-trimellitic acid, 1,2,5-naphthalenetricarboxylic acid, 2,6,7-naphthalenetricarboxylic acid, 3,3',4-diphenyltricarboxylicacid, benzophenone-3,3',4-tricarboxylicacid pyromellitic acid, diphenyl-2,2',3 3'-tetracarboxylic acid, diphenyl ether-2,2',3 3'-tetracarboxylic acid and anhydrides thereof.

12. A vinyl resin composition according to claim 11, wherein trimellitic anhydride or trimellitic acid is used as said aromatic polycarboxylic acid.

13. The vinyl resin composition according to claim 1, wherein said polyoxyalkylene glycol other than polyoxyethylene glycol is selected from the group consisting of polyoxytetramethylene glycol, modified polyoxytetramethylene glycol, and polyoxypropylene glycol, which have a molecular weight of 500 to 5,000.

14. The vinyl resin composition according to claim 13, wherein said modified polyoxytetramethylene glycol is a product obtained by substituting 3 to 50 % by weight of the —(CH$_2$)$_4$—O— moieties in polyoxytetramethylene glycol with the moiety —R—O—, wherein R is an alkylene group of 2–10 carbon atoms selected from the group consisting of ethylene, 1,2-propylene, 1,3-propylene, 2-methyl-1,3-propylene, 2,2-dimethyl-1,3-propylene, pentamethylene, and hexamethylene.

15. The vinyl resin composition according to claim 1, wherein said vinyl polymer is selected from the group consisting of a rubber modified polystyrene resin, styrene-butadiene-acrylonitriie copolymer resin, styrene-rubber copolymer-methyl acrylate resin, styrene-rubber copolymer-methyl methacrylate resin, styrene-acrylonitrile copolymer resin, random, block or graft polymers obtained from styrene monomer as the main component and copolymerizing therewith another vinyl monomer selected from the group consisting of methyl methacrylate, methyl acrylate, maleimide and acrylamide, styrene resins blended with other thermoplastic resins, styrene resins containing a carboxyl group, styrene resins containing an epoxy group, styrene resins containing an oxazoline group, styrene resins containing an amide group, styrene resins containing an imide group, styrene resins containing a hydroxyl group, polymethyl methacrylate resin, rubber-reinforced polymethyl methacrylate, methyl methacrylate-butadiene-styrene copolymer resin, and methyl methacrylate-acrylonitrile-butadiene-styrene copolymer resin.

16. The vinyl resin composition according to claim 15, wherein said vinyl polymer is selected from the group consisting of polymethyl methacrylate resin, rubber-reinforced polymethyl methacrylate, methyl methacrylate-butadiene-styrene copolymer resin, and methyl methacrylate-acrylonitrile-butadiene-styrene copolymer resin.

17. A vinyl resin composition which comprises (1) 100 parts by weight of a resin composition comprising (A) 97–70 % by weight, based on 100 parts of said resin composition of a vinyl polymer selected from the group consisting of a rubber modified polystyrene resin, styrene-butadiene-acrylonitrile copolymer resin, styrene-rubber copolymer-methyl acrylate resin, styrene-rubber copolymer-methyl methacrylate resin, styrene-acrylonitrile copolymer resin, random, block or graft polymers obtained from styrene monomer as the main component and copolymerizing therewith another vinyl monomer selected from the group consisting of methyl methacrylate, methyl acrylate, maleimide and acrylamide, styrene resins blended with other thermoplastic resins, styrene resins containing a carboxyl group, styrene resins containing an epoxy group, styrene resins containing an oxazoline group, styrene resins containing an amide group, styrene resins containing an imide group, styrene resins containing a hydroxyl group, polymethyl methacrylate resin, rubber-reinforced polymethyl methacrylate, methyl methacrylate-butadiene-styrene copolymer resin, and methyl methacrylate-acrylonitrile-butadiene-styrene copolymer resin; and B) 3–30% by weight, based on 100 parts of said resin composition of a polyamideimide elastomer obtained by reacting
  a) caprolactam,
  b) a tribasic or tetrabasic aromatic polycarboxylic acid capable of forming at least one imide ring, selected from the group consisting 1,2,4-trimellitic acid, 1,2,5-naphthalenetricarboxylic acid, 2,6,7-naphthalenetricarboxylic acid, 3'3',4-tricarboxylic acid, pyromellitic acid, diphenyl-2,2',3,3'-tetracarboxylic acid, diphenyl ether-2,2',3,3'-tetracarboxylic acid, anhydrides of the above, and mixtures thereof;
  c) polyoxyethylene glycol or a mixture of at least 50% by weight of polyoxyethylene glycol and a polyoxyalkylene glycol other than polyoxyethylene glycol, wherein said polyoxyalkylene glycol is selected from the group consisting of polyoxytetramethylene glycol, modified polyoxytetramethylene glycol, and polyoxypropylene glycol, which have a molecular weight of 500 to 5,000; and
  d) 0–0.5 mole of a diamine or diisocyanate compound per 1 mole of the glycol of component c), glycol component c) being present in a proportion of 85–30% by weight in the elastomer and the relative viscosity of said elastomer being at least 1.5 at a temperature of 30° C., wherein said diamine is selected from the group consisting of hexamethylene-diamine and 4,4'-diphenylmethylanediamine, and wherein said diisocyanate is selected from the group consisting of hexamethylene diisocyanate and 4,4'-diphenylmethane diisocyanate; and (2) 0–10 parts by weight based on 100 parts by weight of said resin composition of at least one electrolyte selected from the group consisting of quaternary ammonium salts, organic phosphonium salts, aromatic sulfonic acids, alkali or alkaline earth metal salts thereof, alkyl sulfonic acids, alkali or alkaline earth metal salts thereof, organic carboxylic acids, alkali or alkaline earth metal salts thereof, organic phosphoric acids, alkali or alkaline earth metal salts thereof, NaBr. KBr, $KNO_3$, and $LiNO_3$.

* * * * *